United States Patent
Okubo

(10) Patent No.: US 9,858,962 B1
(45) Date of Patent: Jan. 2, 2018

(54) DISK APPARATUS, CONTROLLER, AND CONTROL METHOD

(71) Applicant: Kabushiki Kaisha Toshiba, Minato-ku, Tokyo (JP)

(72) Inventor: Tomokazu Okubo, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/449,073

(22) Filed: Mar. 3, 2017

Related U.S. Application Data

(60) Provisional application No. 62/423,289, filed on Nov. 17, 2016.

(51) Int. Cl.
| | |
|---|---|
| *G11B 21/02* | (2006.01) |
| *G11B 5/596* | (2006.01) |
| *G11B 20/12* | (2006.01) |
| *G11B 5/09* | (2006.01) |
| *G11B 5/012* | (2006.01) |
| *G11B 20/10* | (2006.01) |
| *G11B 20/18* | (2006.01) |

(52) U.S. Cl.
CPC .......... *G11B 20/1217* (2013.01); *G11B 5/012* (2013.01); *G11B 5/09* (2013.01); *G11B 20/10222* (2013.01); *G11B 20/18* (2013.01); *G11B 2020/1238* (2013.01)

(58) Field of Classification Search
CPC ... G11B 5/59616; G11B 5/5965; G11B 5/746; G11B 5/59655; G11B 5/59627; G11B 20/10; G11B 20/1866; G11B 20/1883; G11B 20/1879; G11B 5/4886; G11B 5/314; G11B 5/6005; G11B 20/1217; G11B 5/012; G11B 5/00; G11B 2020/1238
See application file for complete search history.

(56) References Cited

U.S. PATENT DOCUMENTS

| | | | |
|---|---|---|---|
| 7,982,994 B1 | 7/2011 | Erden et al. | |
| 8,873,178 B2 * | 10/2014 | Erden ................ | G11B 20/1217 360/39 |
| 9,153,264 B1 | 10/2015 | Oberg et al. | |
| 2010/0020435 A1 * | 1/2010 | Chen ..................... | B82Y 10/00 360/77.02 |
| 2015/0029612 A1 | 1/2015 | Haines | |

* cited by examiner

Primary Examiner — Nabil Hindi
(74) Attorney, Agent, or Firm — White & Case LLP

(57) ABSTRACT

According to one embodiment, there is provided a disk apparatus including a disk medium and a controller. The disk medium is able to store a signal with three levels in a track. The track includes a first subtrack and a second subtract. The second subtrack is adjacent to the first subtract. The controller performs a first operation based on a selected level among the three levels, a first bit written in the first subtract corresponding to the selected level, and a second bit written in the second subtrack corresponding to the selected level. The first operation is an operation to correct displacement between a write position of a third bit in the first subtrack and a write position of a fourth bit in the second subtrack in a circumferential direction of the disk medium.

17 Claims, 9 Drawing Sheets

US 9,858,962 B1

DISK APPARATUS, CONTROLLER, AND CONTROL METHOD

CROSS-REFERENCE TO RELATED APPLICATIONS

This application is based upon and claims the benefit of priority from U.S. Provisional Application No. 62/423,289, filed on Nov. 17, 2016; the entire contents of which are incorporated herein by reference.

FIELD

Embodiments described herein relate generally to a disk apparatus, a controller, and a control method.

BACKGROUND

In a disk apparatus such as a magnetic disk apparatus, the value of a write bit is represented by a direction of magnetization on a disk medium. Therefore, increase in the recording density on the disk medium may cause interference between symbols that in turn causes degradation of a read signal.

DETAILED DESCRIPTION

In general, according to one embodiment, there is provided a disk apparatus including a disk medium and a controller. The disk medium is able to store a signal with three levels in a track. The track includes a first subtrack and a second subtrack. The second subtrack is adjacent to the first subtrack. The controller performs a first operation based on a selected level among the three levels, a first bit written in the first subtrack corresponding to the selected level, and a second bit written in the second subtrack corresponding to the selected level. The first operation is an operation to correct displacement between a write position of a third bit in the first subtrack and a write position of a fourth bit in the second subtrack in a circumferential direction of the disk medium.

Exemplary embodiments of a disk apparatus will be explained below in detail with reference to the accompanying drawings. The present invention is not limited to the following embodiments.

Embodiment

Figure 1:
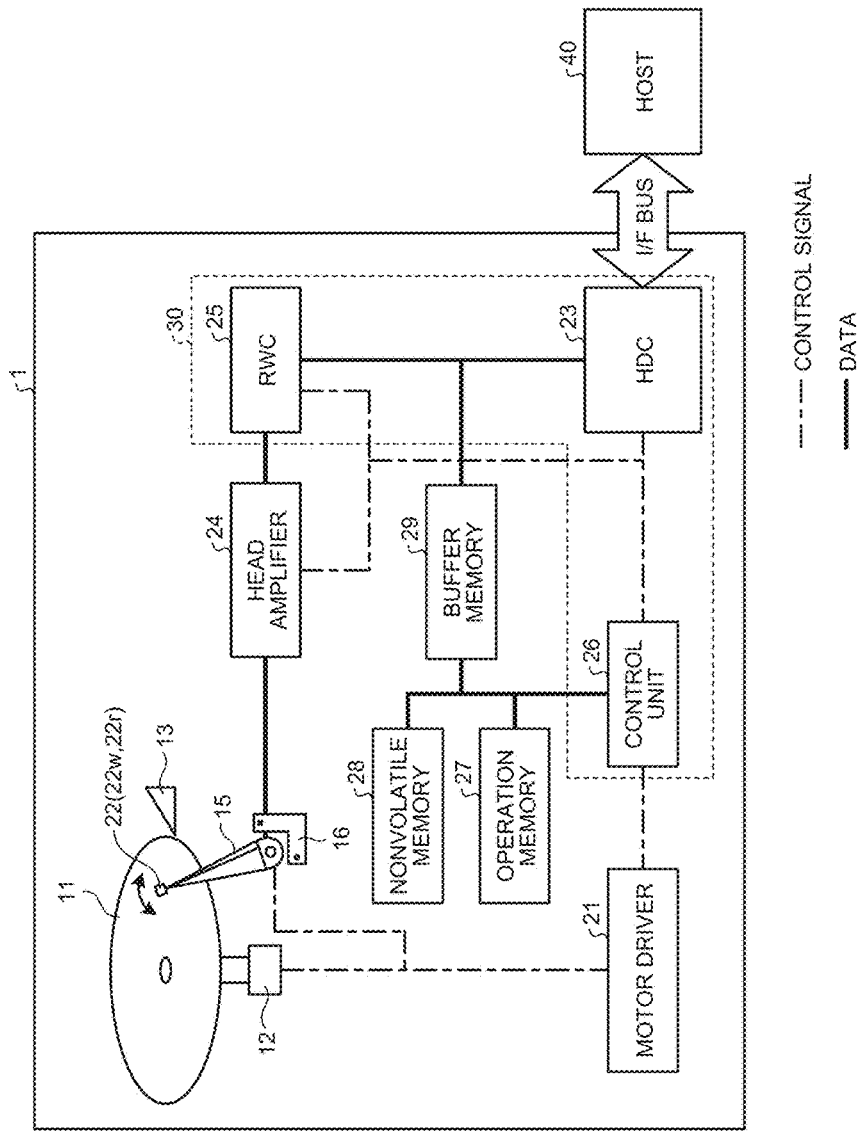
FIG. 1 is a diagram illustrating a configuration of a disk apparatus according to an embodiment.

A disk apparatus 1 according to the embodiment is described with reference to FIG. 1. FIG. 1 is a diagram illustrating a configuration of the disk apparatus 1.

The disk apparatus 1 includes a disk medium 11, and records information in the disk medium 11 in response to a request from a host 40. For example, the disk apparatus 1 is a magnetic disk apparatus, a magneto-optical disk apparatus, and the like. Although a case where the disk apparatus 1 is a magnetic disk apparatus is exemplified below, the present embodiment can be also applied to other apparatuses.

For example, the disk apparatus 1 records information in the disk medium 11 via a head 22 and reads out a signal from the disk medium 11 via the head 22. Specifically, the disk apparatus 1 includes the disk medium 11, a spindle motor 12, a motor driver 21, the head 22, an actuator arm 15, a voice coil motor (VCM) 16, a lamp 13, a head ampler 24, a read/write channel (RWC) 25, a hard disk controller (HDC) 23, a buffer memory 29, and a control unit 26.

The disk medium 11 is rotated around a rotation shaft at a predetermined rotational speed by the spindle motor 12. The rotation of the spindle motor 12 is driven by the motor driver 21. The disk medium 11 can be a magnetic disk or a magneto-optical disk, for example. The disk medium 11 is a recording medium having a perpendicular magnetic recording layer, for example. For example, a plurality of servo regions that radially extend from around a center of the disk medium 11 are defined on each of front and back surfaces of the disk medium 11. The servo regions can be arranged at a regular interval in a circumferential direction. For example, servo information including servo patterns is written in the servo region. Also, a plurality of tracks are defined by the servo patterns concentrically from around the center of the disk medium 11 on each of the front and back surfaces of the disk medium 11. In each track, a data region to which user data is written is provided between the plural servo regions. That is, the servo region and the data region are alternately arranged in a repeated manner in each track along its entire circumference.

The head 22 performs writing and reading of data for the disk medium 11 with a write element $22w$ and a read element $22r$ included in the head 22. The head 22 is arranged at a tip of the actuator arm 15, and is moved along a radial direction (a track-width direction) of the disk medium 11 by the VCM 16 driven by the motor driver 21. While rotation of the disk medium 11 is stopped, for example, the head 22 is retracted to a position above the lamp 13.

The head amplifier 24 amplifies the signal read with the head 22 from the disk medium 11, and outputs and supplies the amplified signal to the RWC 25. The head amplifier 24 also amplifies a signal for writing data in the disk medium 11 supplied from the RWC 25, and supplies the amplified signal to the head 22.

The HDC 23 controls transmission and reception of data to and from the host 40 via an I/F bus, controls the buffer memory 29, and performs a data-error correction process on written data. The buffer memory 29 is used as a cache of data to be transmitted and received to and from the host 40. The buffer memory 29 is used, for example, for temporarily storing therein data read from the disk medium 11, data to be written on the disk medium 11, or control firmware read from the disk medium 11.

The RWC 25 performs code modulation on the data that is written on the disk medium 11 and is supplied from the HDC 23, and then supplies the modulated data to the head amplifier 24. The RWC 25 also performs code demodulation on the signal read from the disk medium 11 and supplied from the head amplifier 24, and then outputs the demodulated signal to the HDC 23 as digital data.

An operation memory 27 (for example, an SRAM: Static Random Access Memory), a nonvolatile memory 28 (for example, a Flash ROM: Flash Read Only Memory), and the buffer memory 29 for temporal storage (for example, an SDRAM: Synchronous Dynamic Random Access Memory) are connected to the control unit 26. The control unit 26 executes overall control of the disk apparatus 1 in accordance with firmware (program data) stored in the nonvolatile memory 28 and the disk medium 11 in advance. The control unit 26 is a CPU, for example. The firmware is initial firmware and is the control firmware that is used for a normal operation. The initial firmware that is to be executed first at the time of initialization is stored in the nonvolatile memory 28, for example. The control firmware can include a portion of functions of a controller 30 (see FIG. 5) as described later. Further, the control firmware used for a normal operation is written on the disk medium 11, is read out from the disk medium 11 into the buffer memory 29 once by control in accordance with the initial firmware, and is thereafter stored in the operation memory 27.

It should be noted that a configuration including the RWC 25, the control unit 26, and the HDC 23 can be regarded as the controller 30.

In the disk apparatus 1 such as a magnetic disk apparatus, the value of a write bit is represented by a direction of magnetization on the disk medium 11. Therefore, increase in the recording density on the disk medium 11 may cause interference between symbols, which in turn causes degradation of the quality of a read signal. For example, there is an information recording method for recording two values of '+0.5' (a state where the direction of magnetization is a first direction) and '−0.5' (a state where the direction of magnetization is a second direction that is opposite to the first direction) on the disk medium 11 as the value of the write bit. In the information recording method, it is difficult to suppress degradation of the quality of the read signal and to improve the recording density of information at the same time.

In the present embodiment, the disk apparatus 1 is configured to be capable of recording three signal levels of +1, 0, and −1 in the disk medium 11. Recording of a three level recording symbol on the disk medium 11 increases an information amount per symbol. With this configuration, it is possible to increase the amount of information recordable in the disk medium 11 while increasing a recording pitch of the symbols, so that the recording density can be improved while interference between these symbols is suppressed. That is, the substantive amount of information recordable in one recording symbol can be increased by handling a recording state of the one recording symbol as the three levels (+1, 0, −1), so that a surface recording density (BPI×TPI) on the disk medium 11 can be increased.

Figure 2A:
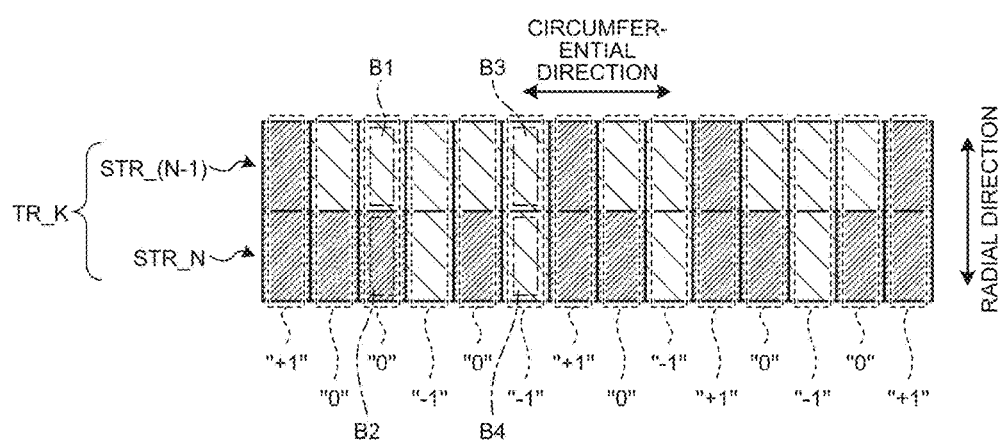
FIG. 2A and FIG. 2B are diagrams illustrating states of written magnetization of a track in the embodiment.

For example, as one method for realizing a three-level magnetization state, a single reproduction track TR_K (K is an arbitrary integer) is configured to further include two subtracks STR_(N−1) and STR_N (N is an arbitrary integer larger than K, for example, N=K×2), as illustrated in FIG. 2A. FIG. 2A is a diagram illustrating states of written magnetization of the track TR_K (values of a write bit). For example, in each of the subtracks STR_(N−1) and STR_N, a state where the direction of magnetization is a first direction (the value of the write bit) is represented as '+0.5' (a state with dense hatching in FIGS. 2A. and 2B) and. a state where the direction of magnetization is a second direction that is opposite to the first direction (the value of the write bit) is represented as '−0.5' (a state with thin hatching in FIGS. 2A. and 2B). In this case, a method can be considered in which a signal with three levels is represented by setting recording states of two values in the two subtracks STR_(N−1) and STR_N arranged in a cross-track direction to (+0.5, +0.5)=+1, (−0.5, +0.5)=0, and (−0.5, −0.5)=−1. That is, in the disk medium 11, a signal with three levels can be written in a data region in the track TR_K by a combination of a write bit written in the subtrack STR_(N−1) and a write bit written in the subtrack STR_N. The track TR_K can be regarded as one track for a recording symbol. Other than this method, a method for performing unsaturated recording with three levels can be also considered.

Figure 3A:
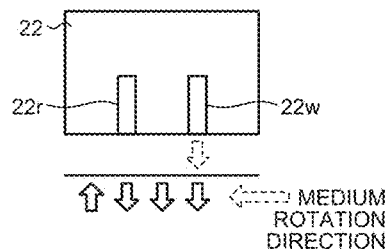
FIG. 3A to FIG. 3F are diagrams illustrating control positions of a write element and a read element in the embodiment.
Figure 3B:
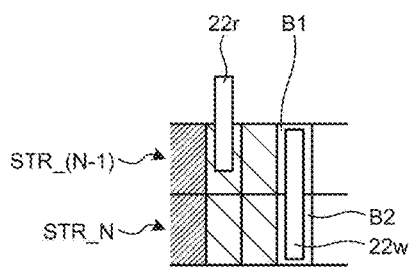
Figure 3C:
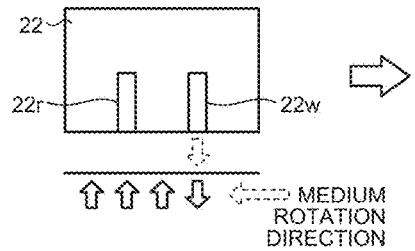
Figure 3E:
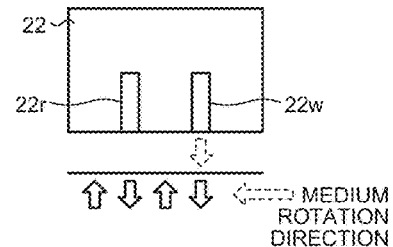
Figure 3D:
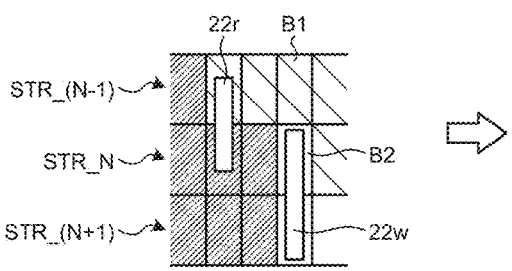

Writing operation of the write bit to the data region as illustrated in FIG. 2A can be realized with a shingled magnetic recording scheme illustrated in FIGS. 3A to 3D, for example. FIGS. 3A and 3C are cross-sectional views illustrating control positions of the write element 22w and the read element 22r. FIGS. 3B and 3D are plan views illustrating the control positions of the write element 22w and the read element 22r. That is, a write bit is written on the disk medium 11 by performing recording twice with the write element 22w. In first writing operation illustrated in FIGS. 3A and 3B, write bits '+0.5', '−0.5', and '−0.5' are written to the two subtracks STR_(N−1) and STR_N at the same time by one write element 22w. In second writing operation illustrated in FIGS. 3C and 3D, the write element 22w is shifted toward the subtrack STR_N by the width of one subtrack, and write bits '+0.5', '−0.5', and '−0.5' are written to two subtracks STR_N and STR_(N+1) at the same time by the write element 22w. The subtrack STR_(N+1) and a subtrack STR_(N+2) are included in a track TR_(K+1). The track TR_(K+1) is adjacent to the track TR_K. That is, the write bits '+0.5', '+0.5', and '+0.5' are written to the subtrack STR_N by the write element 22w. In this manner, symbols (+0.5, +0.5)=+1, (−0.5, +0.5)=0, (−0.5, +0.5)=0 are written on the disk medium 11 in that order (see FIG. 2A).

Figure 3F:
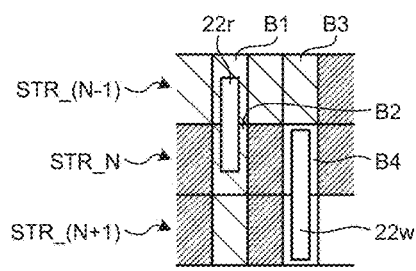

Reading operation of the write bits illustrated in FIG. 2A from the data region can be realized by a reading method illustrated in FIGS. 3C to 3F, for example. FIG. 3E is a cross-sectional view illustrating the control positions of the write element 22w and the read element 22r. FIG. 3F is a plan view illustrating the control positions of the write element 22w and the read element 22r. As illustrated in FIGS. 3C and 3D, magnetization information is read from the two subtracks STR_(N−1) and STR_N at the same time by the read element 22r. With this reading operation, signals respectively corresponding to values of symbols (+0.5, +0.5)=+1, (−0.5, +0.5)=0, and (−0.5, +0.5)=0 can be read in that order from regions where those symbols are written (see FIG. 2A). Similarly, magnetization information is read from the two subtracks STR_(N−1) and STR_N at the same time by the read element 22r as illustrated in FIGS. 3E and 3F. With this reading operation, signals respectively corresponding to values of symbols (−0.5, −0.5)−−1, (−0.5, +0.5)=0, and (−0.5, −0.5)=−1 can be read in that order from regions where those symbols are written (see FIG. 2A).

That is, a method of using a boundary in shingled magnetic recording can be considered as one method for realizing multi level reading operation. This method is a method in which an intermediate bit between the write bits '+0.5' and '−0.5' is generated by performing reading operation for the plural subtracks STR_(N−1) and STR_N at the same time. For example, in a case of three level recording operation, the read element 22r is positioned near a center of a boundary between the two subtracks STR_(N−1) and STR_N for which two level writing operation has been performed, and reading operation is performed there. With this reading operation, a synthesized signal of a value of a write bit in the subtrack STR_(N−1) and a value of a write bit in the subtrack STR_N is read out with the read element 22r. When the two subtracks STR_(N−1) and STR_N are (−0.5, +0.5) or (+0.5, −0.5), it is possible to read out a signal with a level corresponding to a level '0' of a recording symbol.

Because a multi level symbol is realized by a combination of the write bits on the plural subtracks STR_(N−1) and STR_N in the method in which multi level writing operation is realized with the shingled magnetic recording scheme, it is desirable that phases of corresponding write bits between the plural subtracts STR_(N−1) and STR_N are synchronized with each other on the disk medium 11.

Figure 2B:
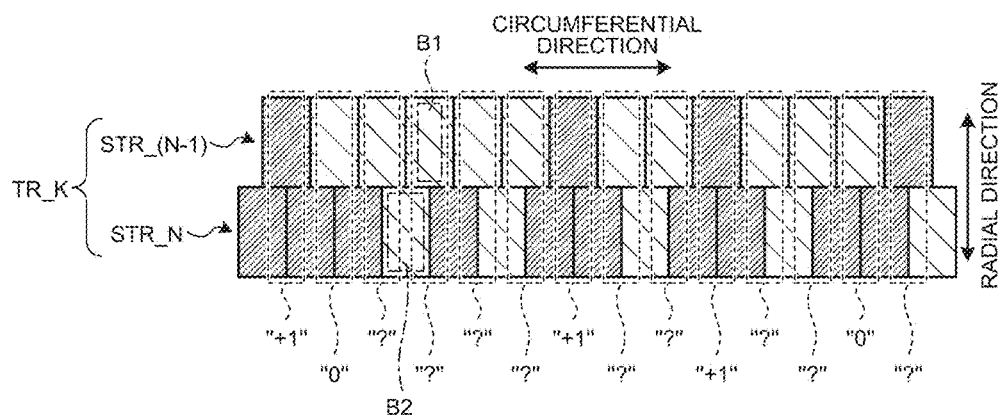
Figure 4:
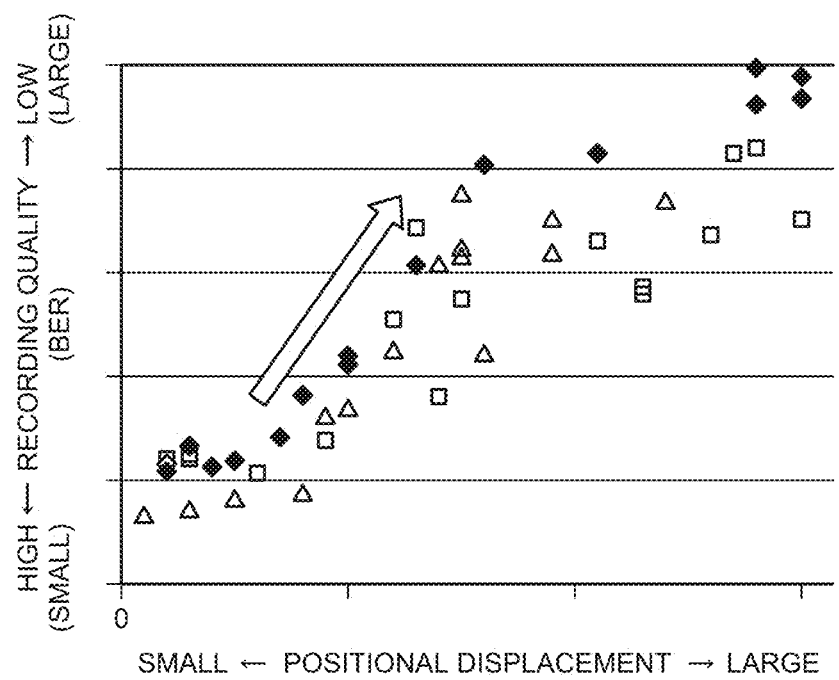
FIG. 4 is a diagram illustrating a relation between positional displacement of subtracks and recoding quality in the embodiment.

However, in the disk apparatus 1, displacement between write positions of corresponding write bits in a symbol in the plural subtracts STR_(N−1) and STR_N in the circumferential direction of the disk medium 11 can be generated to exceed an allowable range as illustrated in FIG. 2B. For example, because a servo region and a data region are located to be separated from each other in each track, even when a phase of a write clock is matched between the plural subtracts STR_(N−1) and STR_N in the servo region, the phase of the write clock may be gradually shifted in the data region. When a jitter is generated in a write gate signal because of the phase shift of the write clock, the displacement between the write positions of the corresponding write bits in the plural subtracts STR_(N−1) and STR_N can be generated to exceed the allowable range. Further, in the disk apparatus 1, the displacement between the write positions of the corresponding write bits in the plural subtracts STR_(N−1) and STR_N in the circumferential direction of the disk medium 11 can be caused by a variation in a rotational number of the spindle motor 12 to exceed the allowable range. When the displacement between the write positions of the corresponding write bits in the plural subtracts STR_(N−1) and STR_N is generated to exceed the allowable range, it is difficult to read (restore) the signal level corresponding to the recording symbol value by simultaneous reading operation for the plural subtracts STR_(N−1) and STR_N, as indicated with "?" in FIG. 2B. With this configuration, as illustrated in FIG. 4, there is a possibility that degradation of the recording quality (for example, a bit error rate) exceeds an allowable range. FIG. 4 is a diagram illustrating a relation between an amount of displacement between write positions in a plurality of subtracts and recoding qualities, and indicates a tendency that, as the amount of the displacement between the write positions in the plural subtracts in the circumferential direction of the disk medium 11 becomes larger, a bit error rate (BER) of a signal obtained by simultaneous reading for the plural subtracts STR_(N−1) and STR_N becomes larger, so that the recording quality of a track including the plural subtracks is degraded.

Therefore, the present embodiment proposes, in the disk apparatus 1, correcting the displacement between the write positions of the corresponding bits in the plural subtracks STR_(N−1) and STR_N in the circumferential direction of the disk medium 11 based on the level of a signal read from the plural subtracks STR_(N−1) and STR_N and a target level obtained from a recording symbol, and then performing a write operation of writing the next bit so as to improve the recording quality in multi level writing operation.

Specifically, write bit series for two subtracks are generated by encoding of a three level recording symbol, and the generated write bit series are respectively written in the two subtracks STR_(N−1) and STR_N, for example. Thereafter, during writing for the second subtrack STR_N of the two subtracks STR_(N−1) and STR_N constituting three level recording, a parameter (the phase shift of the write clock) that is related to the displacement between the write positions is evaluated by using a three level read signal. When the displacement between the write positions in the plural subtracks in the circumferential direction of the disk medium 11 is generated, a multi level reading output during simultaneous reading operation of the plural subtracks is varied. Therefore, it is possible to estimate phase shift amount of the write clock between the plural subtracks and phase shift orientation from an amplitude difference between the multi level reading output read immediately after recording (an actual PR target) and an ideal multi level reading output expected from the write bit series (an ideal PR target). Although a variation in the read output is not constant with respect to the phase shift, a sign of a change becomes constant after classification by the write bit series including up to a previous one bit. It is possible to estimate a direction of the phase shift and an absolute value thereof (the phase shift amount) by using an amplitude difference of a specific pattern or an amplitude difference obtained by performing addition and subtraction in accordance with a pattern.

Thereafter, an appropriate gain is added to each of the direction and the phase shift amount that have been estimated, and feedback is performed for a write-signal generator by using them as correction amounts for the write clock. With this feedback operation, the displacement between the recoding positions in the plural subtracks STR_(N−1) and STR_N is corrected in real time. In order to monitor and correct the displacement between the write positions in the subtracts STR_(N−1) and STR_N in real time, it is possible to use the configuration of the head 22 (see FIGS. 3A, 3C, and 3E) in which the read element 22r is arranged on a trailing side (a downstream side in a medium rotation direction) of the write element 22w. In this configuration of the head 22, it is possible to perform a write operation for the subtrack STR_N and a read operation for the plural subtracks STR_(N−1) and STR_N in parallel by using an offset between the read element 22r and the write element 22w in the radial direction of the disk medium 11. With this configuration, it is possible to perform simultaneous recording and reproduction in which a state of written magnetization (a value of a write bit) can be read immediately after the recording with regard to the subtrack STR_N.

That is, it is possible to estimate the polarity (the orientation) of the phase shift and the absolute value thereof (the phase shift amount) by comparing a PR target (an actual amplitude) obtained from a read signal with a PR target (a target amplitude) expected from an encoded bit series (a write bit series).

Figure 5:
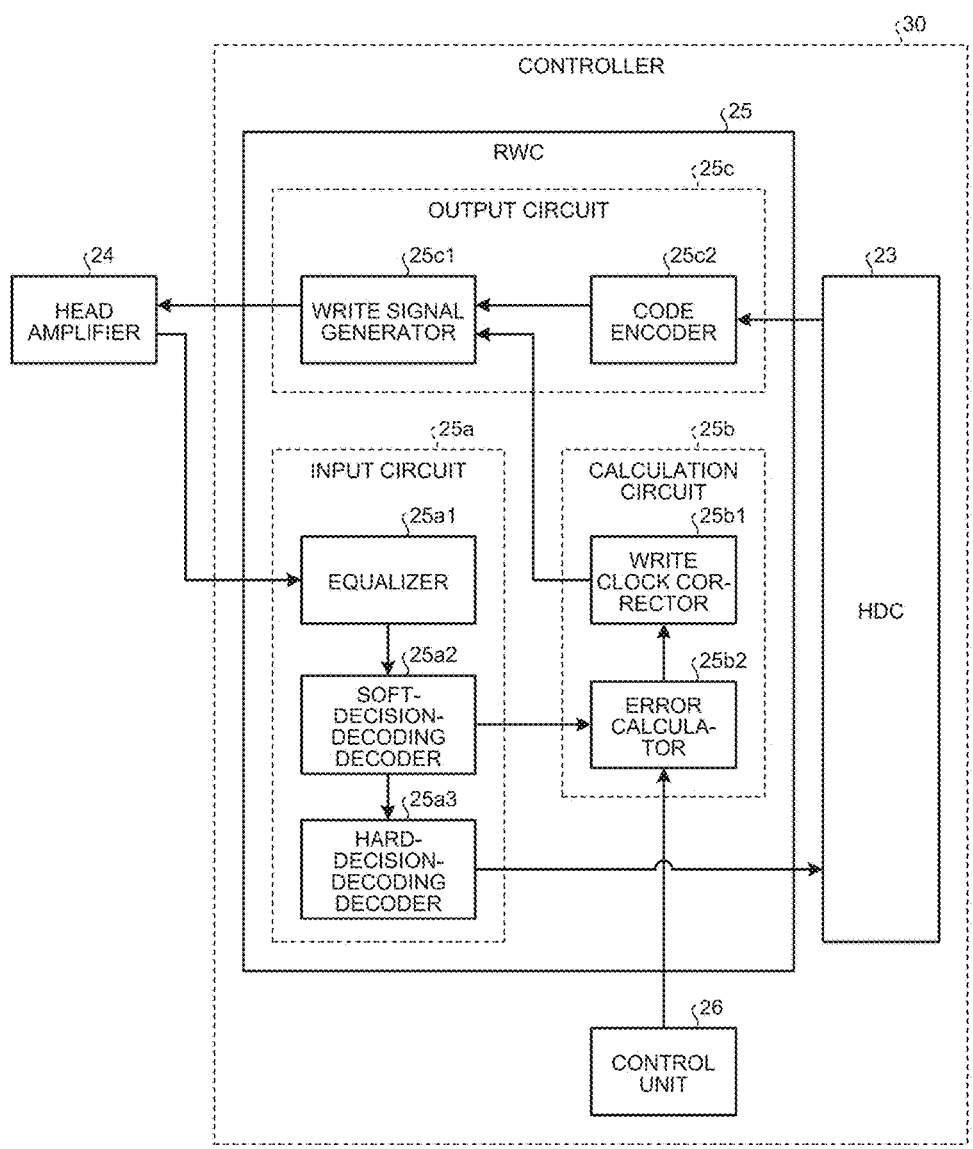
FIG. 5 is a block diagram illustrating a configuration of a controller according to the embodiment.

In order to monitor and correct the phase shift between the plural subtracts STR_(N−1) and STR_N in real time, a hardware configuration illustrated in FIG. 5 can be used, for example. FIG. 5 is a block diagram illustrating a hardware configuration of the controller 30.

The controller 30 includes the RWC 25, the HDC 23, and the control unit (CPU) 26. The RWC 25 includes an input circuit 25a, a calculation circuit 25b, and an output circuit 25c.

The output circuit 25c generates a write signal in synchronization with a write clock, and outputs the write signal to the head 22 via the head amplifier 24.

For example, the output circuit 25c includes a write signal generator 25c1 and a code encoder 25c2. The code encoder 25c2 encodes user data received from the host 40 via the HDC 23 with LDPC codes to generate a code word. The code encoder 25c2 can encode 3-bit user data with a Galois field GF(8) to generate two three level recording symbols. For example, the code encoder 25c2 encodes user data "000", "001", "011", "010", "011", "100", "101", "110", and "111" to generate two three level recording symbols (+1, +1), (+1, 0), (+1, −1), (0, +1), (0, −1), (−1, +1), (−1, 0), and (−1, −1), respectively. The code encoder 25c2 supplies the generated code word to the write signal generator 25c1. The write signal generator 25c1 includes a clock generator (not illustrated), generates the write signal corresponding to the code word (for example, a signal encoded by an NRZ method) in synchronization with the clock generator, and outputs the write signal to the head 22 (the write element 22w) via the head amplifier 24. In this manner, in a case where a signal with a level of '−1' is to be realized by a write bit B1 in the subtrack STR_(N−1) and a write bit B2 in the subtrack STR_N, for example, the write element 22w records the value of the write bit B2 (for example, '+0.5') to a write position illustrated in FIG. 3D in the subtrack STR_N.

A read signal in which a write bit written in the subtrack STR_(N−1) and a write bit written in the subtrack STR_N are synthesized with each other is read with the head 22 (the read element 22r), and is input to the input circuit 25a via the head amplifier 24.

For example, the input circuit 25a includes an equalizer 25a1, a soft-decision-decoding decoder 25a2, and a hard-decision-decoding decoder 25a3. The equalizer 25a1 receives the read signal and performs AD conversion for the read signal to generate a digital signal. The equalizer 25a1 includes a CTF (a low-pass filter) and an FIR filter, and performs waveform equalization for the digital signal by using the CTF and the FIR filter. For example, the equalizer 25a1 equalizes a digital signal RDA to an arbitrary PR (Partial Response) target (for example, a PR target such as PR(1, 2, 2, 2, 1)). The equalizer 25a1 supplies a read waveform after being equalized to the soft-decision-decoding decoder 25a2. The soft-decision-decoding decoder 25a2 performs soft-decision decoding of the LDPC codes for the read waveform after being equalized, by using an SOVA (Soft Output Viterbi Algorithm), for example, and obtains a likelihood of 3-bit data corresponding to the two three level recording symbols. For example, a result of soft-decision decoding by the soft-decision-decoding decoder 25a2 is a likelihood of each pattern of the two recording symbols such as a likelihood of "000", a likelihood of "001" and so on. The soft-decision-decoding decoder 25a2 supplies the result of soft-decision decoding (the likelihood) to the calculation circuit 25b and the hard-decision-decoding decoder 25a3. The hard-decision-decoding decoder 25a3 performs hard-decision decoding of the LDPC codes by using the likelihood, and supplies a result of hard-decision decoding (the user data) to the host 40 via the HDC 23.

The calculation circuit 25b obtains a correction parameter for correcting displacement between the write position of the write bit in the subtrack STR_(N−1) and the write position of the write bit in the subtrack STR_N based on a selected level among three levels and the signal input to the input circuit 25a. That is, the calculation circuit 25b obtains a first parameter and a second parameter based on the selected level among the three levels and the signal input to the input circuit 25a. The first parameter is a parameter related to the amount of the displacement between the write position of the write bit written in the subtrack STR_(N−1) while corresponding to the selected level and the recording positon of the write bit written in the subtrack STR_N while corresponding to the selected level. The second parameter is a parameter related to an orientation of the displacement between the write position of the write bit written in the subtrack STR_(N−1) while corresponding to the selected level and the recording positon of the write bit written in the subtrack STR_N while corresponding to the selected level.

That is, based on the selected level and the signal input to the input circuit 25a, the calculation circuit 25b obtains a phase shift amount of a write clock as the first parameter and also obtains the phase shift orientation as the second parameter. The calculation circuit 25b then obtains a correction amount of the write clock as the correction parameter based on the phase shift amount and the phase shift orientation. The calculation circuit 25b supplies the obtained correction amount of the write clock to the output circuit 25c.

For example, the calculation circuit 25b includes an error calculator 25b2 and a write clock corrector 25b1. The error calculator 25b2 receives the likelihood of the read signal from the soft-decision-decoding decoder 25a2, and receives an ideal PR target value from the control unit 26.

For example, in a case where a signal with a level of '−1' is to be realized by the write bit B1 in the subtrack STR_(N−1) and the write bit B2 in the subtrack STR_N, the write position of the write bit B1 and the write position of the write bit B2 should be synchronized with each other ideally as illustrated in FIG. 2A, but there is a case where these positions are displaced from each other in practice as illustrated in FIG. 2B.

The error calculator 25b2 obtains each of an amplitude of the write bit B1 written in the subtrack STR_(N−1) and an amplitude of the write bit B2 written in the subtrack STR_N from the likelihood with regard to the read signal read by the read element 22r illustrated in FIG. 3F.

Figure 6A:
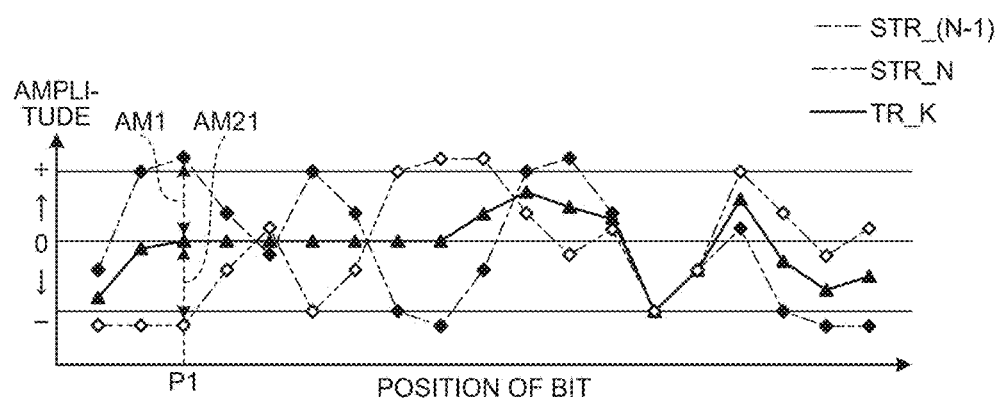
FIG. 6A is a diagram illustrating an ideal PR target value in the embodiment.
Figure 6B:
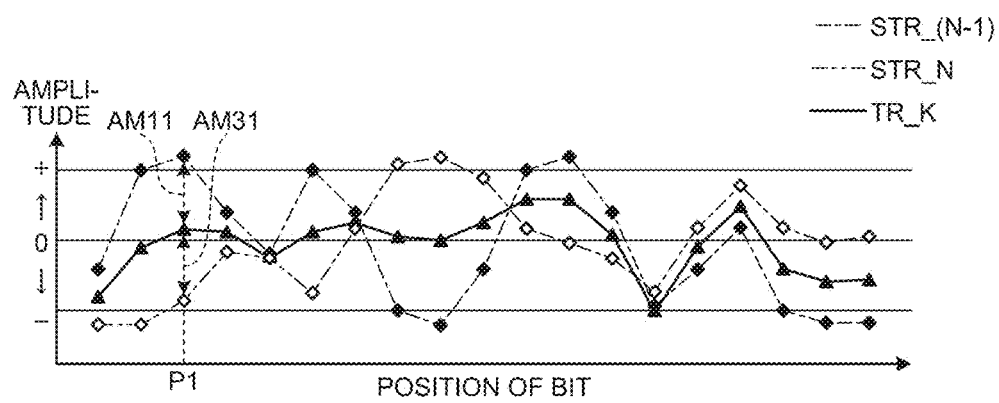
FIG. 6B is a diagram illustrating a PR target value obtained from a read signal in the embodiment.

For example, in a case where the likelihood with regard to the read signal is obtained as illustrated with a solid line in FIG. 6B, the error calculator 25b2 obtains an amplitude (a PR target value) of each write bit in the subtrack STR_(N−1) illustrated with a long-dashed short-dashed line in FIG. 6B and an amplitude (a PR target value) of each write bit in the subtrack STR_N illustrated with a long-dashed double-short-dashed line in FIG. 6B. FIG. 6B illustrates a PR target value obtained from a read signal. The vertical axis represents the amplitude of the PR target value and the horizontal axis represents a position of a bit in information to be written. On the horizontal axis in FIG. 6B, the right side corresponds to a write position on a head side (a trailing side) in a rotation direction in a track, and the left side corresponds to a write position on a rear end side (a leading side) in the rotation direction.

The error calculator 25b2 obtains an amplitude error (a PR target error) from a target amplitude (an ideal PR target value) with regard to each of the amplitude (the PR target value) of the write bit B1 and the amplitude (the PR target value) of the write bit B2, and supplies the amplitude errors to the write clock corrector 25b1.

For example, in a case where the ideal PR target value is as illustrated with a solid line in FIG. 6A, the error calculator 25b2 obtains a target amplitude (a PR target value) of each write bit in the subtrack STR_(N−1) as illustrated with a long-dashed short-dashed line in FIG. 6A and a target amplitude (a PR target value) of each write bit in the subtrack STR_N as illustrated with a long-dashed double-short-dashed line in FIG. 6A from the ideal PR target value. FIG. 6A illustrates the ideal PR target value. The vertical axis represents an amplitude of the ideal PR target value, and the horizontal axis represents a position of a bit in information to be written. On the horizontal axis in FIG. 6A, the right side corresponds to a write position on a head side (a trailing side) in the rotation direction in a track, and the left side corresponds to a write position on a rear end side (a leading side) in the rotation direction.

For example, in a case where a target amplitude at a bit position P1 in the subtrack STR_(N−1) obtained from the ideal PR target value is AM1 and an amplitude at the bit position P1 in the subtrack STR_(N−1) obtained from the read signal is AM11 as illustrated in FIGS. 6A and 6B, the error calculator 25b2 can obtain an amplitude error of a write bit at the bit position P1 in the subtrack STR_(N−1) as $\Delta AM11 = AM11 - AM1$. A case where $\Delta AM11 \approx 0$ is exemplified in FIGS. 6A and 6B.

Similarly, in a case where a target amplitude at the bit position P1 in the subtrack STR_N obtained from the ideal PR target value is AM21 and an amplitude at the bit position P1 in the subtrack STR_N obtained from the read signal is AM31, the error calculator 25b2 can obtain an amplitude error of a write bit at the bit position P1 in the subtrack STR_N as $\Delta AM31 = AM31 - AM21$. A case where $|\Delta AM31| > 0$ and $\Delta AM31 > 0$ is exemplified in FIGS. 6A and 6B.

The write clock corrector 25b1 obtains the phase shift amount and the phase shift orientation of the write clock between the subtracks STR_(N−1) and STR_N based on the amplitude error (the PR target error). The write clock corrector 25b1 obtains the correction amount of the write clock based on the phase shift and the phase shift orientation that have been obtained, and supplies the correction amount to the write signal generator 25c1.

For example, the write clock corrector 25b1 multiplies the amplitude error $\Delta AM11$ (=AM11−AM1) by a coefficient k1 that converts the amplitude error into a phase error so as to obtain a phase error $\Delta PS11$ (=k1×$\Delta AM11$). The write clock corrector 25b1 multiplies an amplitude error $\Delta AM2$ (=AM12−AM2) by the coefficient, k1 that converts the amplitude error into the phase error so as to obtain a phase error $\Delta PS31$ (=k1×$\Delta AM31$). The write clock corrector 25b1 then obtains the phase shift orientation as being toward the head side (the trailing side) in the rotation direction based on $|\Delta AM31| > |AM11|$ and $\Delta AM31 > 0$. Further, the write clock corrector 25b1 obtains a phase shift amount $\Delta PS = \Delta PS31 - \Delta PS11$ between the plural subtracks STR_(N−1) and STR_N based on $|\Delta AM31| > |AM11|$. The write clock corrector 25b1 multiplies the phase shift amount $\Delta PS$ by a coefficient k2 that converts the phase shift amount into the correction amount of the write clock so as to obtain the correction amount $\Delta C$ (=k2×$\Delta PS$) for the write clock. The write clock corrector 25b1 then obtains a sign (for example, '−' (minus)) of the correction amount in such a manner that the write clock is advanced in phase, in accordance with that the phase shift orientation is toward the head side (the trailing side) in the rotation direction. The write clock corrector 25b1 adds the sign of the correction amount to the magnitude of the correction amount $\Delta C$ to obtain the correction amount of the write clock (for example, '−$\Delta C$').

When the correction amount of the write clock is supplied, the write signal generator 25c1 corrects the write clock by using the correction amount of the write clock. For example, the write signal generator 25c1 includes a clock generator, and adjusts the clock generator in such a manner that the phase shift between the subtracks STR_(N−1) and STR_N is canceled, so as to advance or delay a timing of the write clock in phase as a whole. The write signal generator 25c1 generates a signal for recording a bit B4 to the subtrack STR_N in synchronization with the corrected write clock. As a result, it is possible to correct the phase shift between the subtracks STR_(N−1) and STR_N illustrated in FIG. 2B, that is, the displacement between the write position of the write bit B1 and the write position of the write bit B2. That is, in a case where another signal with a level of '−1' is to be realized by a write bit B3 in the subtrack STR_(N−1) and the write bit B4 in the subtrack STR_N, it is possible to synchronize the write position of the write bit B3 and the write position of the write bit B4 as illustrated in FIG. 2A.

Figure 7:
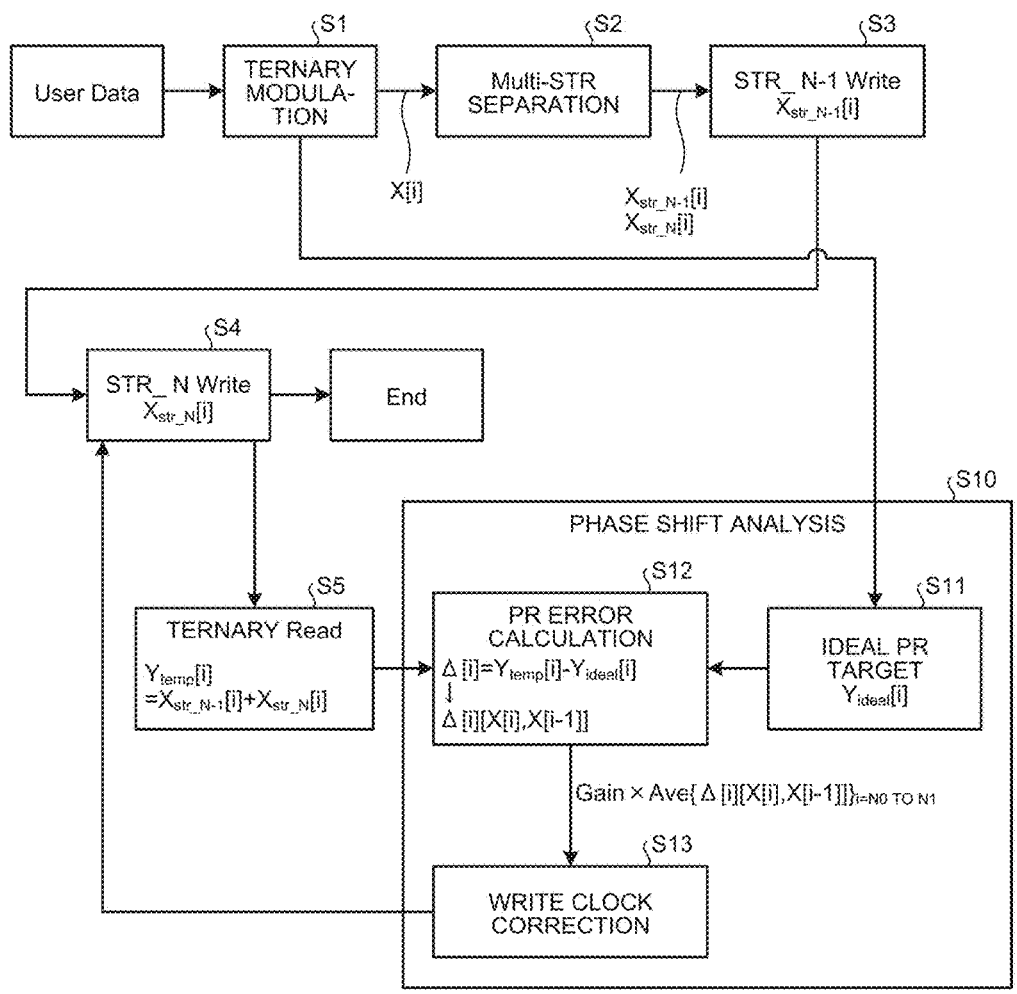
FIG. 7 is a sequence diagram illustrating an operation of three level recording in the embodiment.

Next, an outline of a three level recording sequence with a shingled magnetic recording scheme is described with reference to FIG. 7. FIG. 7 is a sequence diagram illustrating an operation of three level recording with a shingled magnetic recording scheme.

In the disk apparatus 1, first, three level modulation is performed on user data {0, 1} (S1) to generate a three level encoded data series X[i]={−1, 0, +1}. Thereafter, the data series X[i] is separated into sub-data series $X_{STR\_N-1}[i]$ and $X_{STR\_N}[i]$ of a binary form for recording for two subtracks, in order to perform multi level recording in accordance with the shingled magnetic recording scheme (S2), and recording of three level information is performed on the subtracks STR_N−1 and STR_N in that order in accordance with the shingled magnetic recording scheme. That is, information is written in the subtracts STR_N−1 and STR_N by the write element 22w (S3), the write element 22w is shifted toward the subtract STR_N+1 by one subtract, and information is written in the subtracts STR_N and STR_N+1 by the shifted write element 22w (S4).

At this time, it is necessary that the sub-data series $X_{STR\_N-1}[i]$ and $X_{STR\_N}[i]$ have been written with phases thereof synchronized with each other (completely, for example) on a medium in order to realize three level recording and reproduction. Accordingly, when recording of the sub-data series $X_{STR\_N-1}[i]$ is performed, reproduction of a three level signal is performed at the same time, and a phase shift is monitored and corrected based on an error (a PR target error) between an ideal PR target value and an actual PR target value obtained from a read signal. Therefore, the head 22 used in this recording and reproduction has a configuration in which the read element 22r is arranged on the trailing side of the write element 22w and a read signal of a bit can be monitored immediately after recording of that bit is performed.

Figure 8:
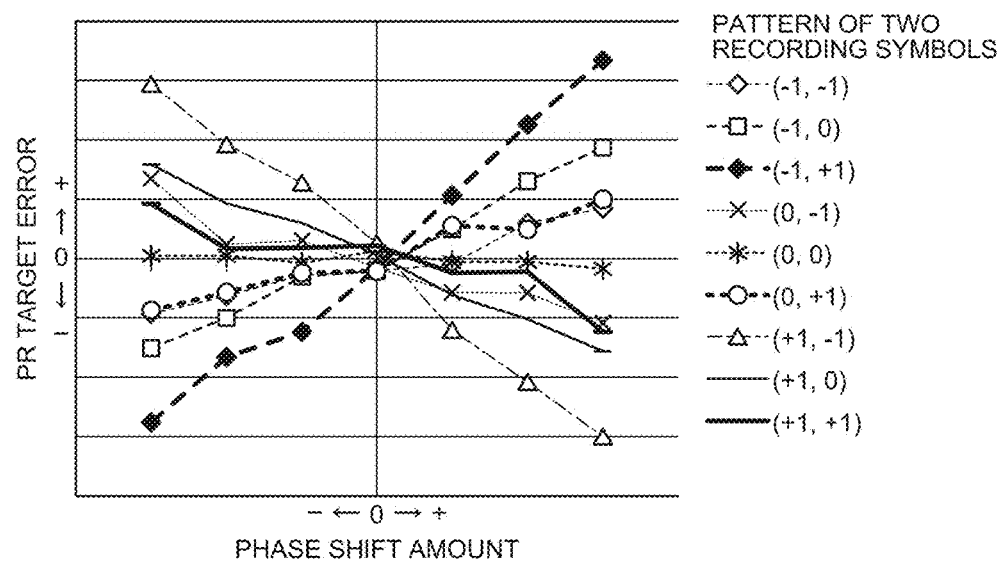
FIG. 8 is a diagram illustrating a relation between a phase shift amount in subtracks and a PR target error for each pattern of recording symbols in the embodiment.

An example (an ideal PR target) of a read signal that is ideal (in a case of no phase shift), obtained after writing for the subtract STR_N is illustrated in FIG. 6A. In FIG. 6A, ideal read signals in a case where a write bit in each of the subtracts STR_(N−1) and STR_N included in the track TR_K is read independently are illustrated with a long-dashed short-dashed line and a long-dashed double-short-dashed line, respectively, and an ideal read signal of the track TR_K in a case where the write bits in the plural subtracts SRT_(N−1) and STR_N are simultaneously read is illustrated by a solid line. In FIG. 6B, an example (an actual PR target) in a case where a phase shift occurs during recording for the subtrack STR_N with respect to data of the subtrack STR_N-1 is illustrated. This example illustrates a case where a recording phase of the subtrack STR_N is advanced relatively, and it can be also found that because of this phase shift a multi-value read signal after synthesis is also varied. Although the variation amount appears to be at random in terms of individual bits, the change amount (the PR target error) of the multi-value read signal depends on a phase shift amount including a polarity and a bit series, because, in practice, the multi-value read signal is obtained as superimposition of the two subtracks. When the PR target error is specifically plotted for each bit series by using the phase shift amount as a variable, characteristics illustrated in FIG. 8 are obtained, for example. FIG. 8 is a diagram illustrating a relation between a phase shift amount between subtracks and a PR target error for each pattern of two recording symbols. It can be found from FIG. 8 that the PR target error maintains almost linearity with respect to the phase shift amount of each pattern (bit series) of the two recording symbols. Based on this fact, it is possible to estimate and correct the phase shift amount by using information on a PR target error of a specific bit series.

Referring back to FIG. 7, the controller 30 performs operations up to recording of the sub-data series $X_{STR\_N-1}[i]$ (S3), and thereafter monitors a multi-value read signal $Y_{temp}[i]=X_{STR\_N-1}[i]+X_{STR\_N}[i]$ immediately after the recording (S5), while performing recording of the sub-data series $X_{STR\_N}[i]$ for the second subtrack (S4). The controller 30 analyzes the amount and orientation of a phase shift between write positions in the plural subtracks STR_N-1 and STR_N in the circumferential direction of the disk medium 11 based on the actual PR target and the ideal PR target (S10).

Specifically, the controller 30 has already obtained the PR target (the ideal PR target=$Y_{ideal}[i]$) that is expected from the three level modulated data series X[i], during three level modulation (S1) and therefore the ideal PR target is known (S11). Therefore, the controller 30 obtains a shift amount of the multi-value read signal from an ideal read signal as a PR target error $\Delta[i]=Y_{temp}[i]-Y_{ideal}[i]$ (S12). Labeling is performed for the PR target error in such a manner that $\Delta[i]$ is labelled as $\Delta[i][X[i-1], X[i]]$ to include up to a previous one bit (X[i-1]) in order to estimate the phase shift amount, a total (a sum or an average) of the PR target errors for a certain number of bits is set as a correction coefficient Average$\{\Delta[i][X[i-1], X[i]]\}$i=N0 to N1, and an appropriate Gain factor is added to the correction coefficient. The correction coefficient with the Gain factor added thereto is a parameter in which the phase shift amount and the orientation are quantified. By incorporating this parameter as a correction value for the write clock (S13), it is possible to correct the phase shift in real time during write for the subtrack STR_N (S4).

Figure 9:
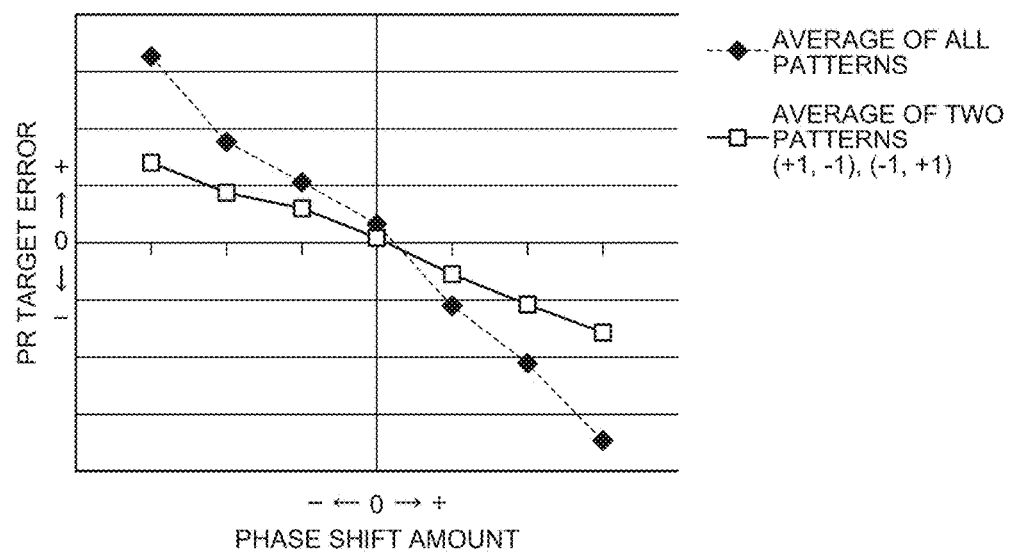
FIG. 9 is a diagram illustrating a relation between a phase shift amount of subtracks averaged with respect to patters of a plurality of recording symbols and a PR target error in the embodiment.

As a definition of the correction coefficient, a correction coefficient defined for each pattern (bit series) of two recording symbols may be used as illustrated in FIG. 8, or a correction coefficient that is averaged to some extent may be used as illustrated in FIG. 9. FIG. 9 exemplifies a definition that uses error information of a pattern highly sensitive to the phase shift, Average$\{\Delta[i][-1, +1]-\Delta[i][+1, -1]\}$i=N0 to N1, and a definition that convolves a sign function in accordance with the bit series therein $\{\Sigma i=N0$ to $N1\{sign[n, m] \times \Delta[i][n, m]\}||n, m=-1, 0, +1\}$, for example. Also in a case of using either definition, almost linearity with respect to the phase shift amount is established, and the correction coefficient can be used for correcting the phase shift.

Figure 10:
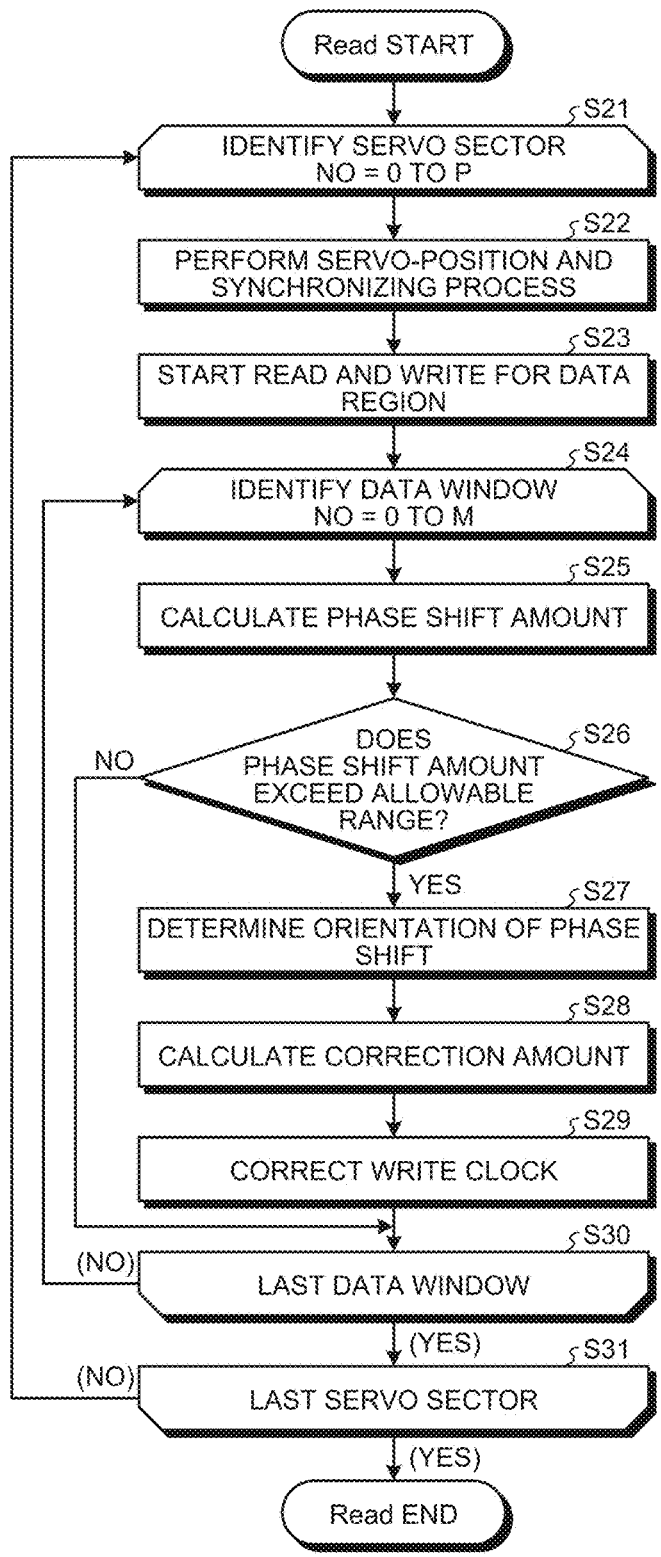
FIG. 10 is a flowchart illustrating an operation of the controller in the embodiment.

For example, as illustrated in FIG. 10, the controller 30 can control correction of a phase shift during reading. FIG. 10 is a flowchart illustrating an operation of the controller 30.

In each track on the disk medium 11, a servo region and a data region are alternately arranged to be repeated multiple times along its an entire circumference. For example, P (P is an integer equal to or larger than 2) servo sector regions each including the servo region and the data region adjacent to each other are arranged in each track. Servo information written in the servo region in each servo sector region includes identification information (a servo sector number) of the servo sector region.

The controller 30 identifies a current servo sector number based on the servo information when the servo information is read from the servo region by the read element 22r (S21). The current servo sector number is any of 0 to P, for example.

The controller 30 also controls positioning of the read element 22r by using the servo information read from the servo region (S22). That is, the controller 30 obtains an offset amount of the read element 22r from a target position (for example, a boundary position between the subtracks STR_(N-1) and STR_N) in a cross-track direction based on the servo information read from the servo region. The controller 30 then executes control of bringing the read element 22r close to the target position based on the offset amount. That is, the controller 30 applies a gain to the offset amount to obtain a driving amount of the read element 22r for canceling the offset amount, and executes control of correcting the position of the read element 22r in the cross-track direction in accordance with the driving amount (offset-correction control).

The controller 30 also performs a synchronizing process that matches a phase of a write clock to a reference by using the servo information read from the servo region (S22). For example, the controller 30 generates a reference pulse from the servo information and supplies the reference pulse to a clock generator in the write signal generator 25c1. The clock generator includes a PLL and generates the write clock by using the reference pulse signal. The clock generator compares a phase of the reference pulse signal and a phase of an internal clock with each other, and generates a control signal in accordance with a result of that comparison. The clock generator generates a clock that is caused to oscillate at a frequency in accordance with the generated control signal, outputs the generated clock, and internally feeds back a clock obtained by dividing the generated clock as the internal clock. In this manner, the clock generator generates the write clock while matching the phase of the write clock to the reference.

Subsequently, the controller 30 starts a read operation and a write operation for the data region (S23). That is, the controller 30 sets M (M is an integer equal to or larger than 2) window sections in the data region in a current servo sector region, and holds setting information in which the window sections and identification information (window numbers) thereof are associated with each other. The window section can be set in an arbitrary manner, and can be set as a section having a width of several tens to several hundreds of bits (a section in which several tens to several hundreds of symbols are written) in a down-track direction (see FIG. 2A), for example. The controller 30 identifies a current window number based on the setting information (S24). The current window number is any of 0 to M, for example. With regard to the current window section, the controller 30 reads data from the subtracks STR_(N−1) and STR_N and also writes data to the subtracks STR_N and STR_(N+1).

The controller 30 calculates a phase shift amount with regard to the current window section (S25). For example, the controller 30 acquires the level of a signal read by the read element 22r from the current window section and a target level corresponding to a recording symbol to be written in the current window section. The controller 30 calculates a difference between the level of each write bit in the subtrack STR_(N−1) obtained from the read signal and the level of each write bit in the subtrack STR_(N−1) obtained from the recording symbol, and obtains an amplitude error (a PR target error) of each recoding bit in the subtrack STR_(N−1). The controller 30 calculates a difference between the level of each write bit in the subtrack STR_N obtained from the read signal and the level of each write bit in the subtrack STR_N obtained from the recording symbol, and obtains an amplitude error (a PR target error) of each recoding bit in the subtrack STR_N. The controller 30 converts the amplitude error of each write bit in the subtrack STR_(N−1) into a phase error, and converts the amplitude error of each write bit in the subtrack STR_N into a phase error. The controller 30 then obtains a phase shift amount between the subtracks STR_(N−1) and STR_N by the Expression 1.

(Phase shift amount between the subtracks $STR\_(N-1)$ and $STR\_N$)=(Average value of phase errors of respective write bits in the subtrack $STR\_N$ in current window section)−(Average value of phase errors of respective write bits in the subtrack $STR\_(N-1)$ in current window section)  Expression 1

The controller 30 determines whether the phase shift amount exceeds an allowable range (S26). For example, the controller 30 compares an absolute value of the phase shift amount with a threshold value, can determine that the phase shift amount exceeds the allowable range when the absolute value of the phase shift exceeds the threshold value, and can determine that the phase shift amount does not exceed the allowable range when the absolute value of the phase shift amount does not exceed the threshold value. The threshold value can be set to m/n (n is an integer equal to or larger than 2 and m is an integer that is smaller than n and is equal to or larger than 2) of a recording pitch in the circumferential direction of the disk medium 11 (see FIGS. 2A and 2B). The threshold value may be experimentally determined in advance. The threshold value can be calibrated in advance.

The controller 30 executes control for correcting the phase shift amount (S27 to S29) when the phase shift exceeds the allowable range (YES at S26), but does not execute the control for correcting the phase shift (returns the process to S30) when the phase shift amount does not exceed the allowable range (NO at S26).

For example, when the phase shift amount exceeds the allowable range (YES at S26), the controller 30 obtains a polarity of the phase shift and obtains an phase shift orientation in accordance with the polarity (S27). For example, in a case of obtaining the phase shift amount by the Expression 1, the controller 30 determines that the write position of the write bit in the subtrack STR_N is advanced in phase with respect to the write position of the write bit in the subtrack STR_(N−1) when the phase shift amount is a positive value. The controller 30 determines that the write position of the write bit in the subtrack STR_N is delayed in phase from the write position of the write bit in the subtrack STR_(N−1) when the phase shift amount is a negative value.

The controller 30 then calculates a correction amount of the write clock that cancels the phase shift amount (S28). For example, the controller 30 calculates a timing-shift amount for advancing or delaying the write clock in phase by multiplying the phase shift amount by a predetermined gain. The controller 30 performs correction in such a manner that a timing of the write clock is advanced or delayed in phase in accordance with the correction amount of the write clock (S29). For example, the controller 30 generates a reference pulse from the servo information, performs adjustment that shifts a timing of a rising edge of the reference pulse by the timing-shift amount calculated at S28, and supplies the adjusted reference pulse to a clock generator in the write signal generator 25c1. The clock generator generates the write clock by using the adjusted reference pulse signal. The clock generator compares a phase of the reference pulse signal and a phase of an internal clock with each other, and generates a control signal in accordance with a result of the comparison. The clock generator generates a clock that is caused to oscillate at a frequency in accordance with the generated control signal, outputs the generated clock, and internally feeds back a clock obtained by dividing the generated clock as the internal clock.

The clock generator generates the write clock having the corrected timing of the rising edge, and the write signal generator 25c1 generates a signal for recoding a bit in the subtrack STR_N, in synchronization with the corrected write clock. Therefore, it is possible to correct the phase shift between the subtracks STR_(N−1) and STR_N, that is, displacement between the write position of the write bit in the subtrack STR_(N−1) and the write position of the write bit in the subtrack STR_N. That is, it is possible to synchronize the write position of the write bit in the subtrack STR_(N−1) and the write position of the write position of the subtrack STR_N.

After completion of S29 or in a case where the phase shift amount does not exceed the allowable range (NO at S26), the controller 30 determines whether the current window section is the last (window number=M) window section in the data region (S30). When the current window section is not the last window section (NO at S30), the controller 30 increments the window number and returns the process to S24.

When the current window section is the last window section (YES at S30), the controller 30 determines whether the current servo sector region is the last (the servo sector number=P) servo sector region in the track (S31). When the current servo sector region is not the last servo sector region (NO at S31), the controller 30 increments the servo sector number and returns the process to S21.

When the current servo sector region is the last servo sector region (YES at S31), the controller 30 ends the read process and the write process for the current track. The controller 30 can perform the same processes as those at S21 to S31 as a read process and a write process for a different track.

As described above, according to the present embodiment, in the disk apparatus 1, the controller 30 corrects displacement between write positions of corresponding bits in the plural subtracks STR_(N−1) and STR_N in the circumferential direction of the disk medium 11 based on the level of a signal read from the plural subtracks STR_(N−1) and STR_N and a target level obtained from a recording symbol, and performs a write operation for the next bit. Therefore, it is possible to correct the amount of displacement between write positions of write bits in a plurality of subtracks in the circumferential direction of the disk medium 11 almost in real time, and to rapidly improve the recording quality of a three level signal that can be realized by a combination of the write bits in the plural subtracks.

According to the present embodiment, in the disk apparatus 1, the controller 30 performs, in parallel to each other, a correction operation for reading a synthesized signal of the write bit B1 in the subtrack STR_(N−1) and the write bit B2 in the subtrack STR_N by the read element 22r and correcting displacement between a write position of the write bit B3 in the subtrack STR_(N−1) and a write position of the write bit B4 in the subtrack STR_N based on the level of the synthesized signal and a target level, and a write operation for writing the write bit B4 to the subtrack STR_N by the write element 22w in accordance with the corrected write position. Therefore, it is possible to correct a phase shift between the write positions of the write bits in the plural subtracks in the circumferential direction of the disk medium 11 almost in real time.

According to the present embodiment, in the disk apparatus 1, the controller 30 obtains an amplitude error of a write bit in the subtrack STR_(N−1) based on the target level and the level of a bit written in the subtrack STR_(N−1) in the correction operation. The controller 30 obtains an amplitude error of a write bit in the subtrack STR_N based on the target level and the level of a bit written in the subtrack STR_N. The controller 30 corrects a write clock based on the amplitude error of the write bit in the subtrack STR_(N−1) and the amplitude error of the write bit in the subtrack STR_N. Therefore, it is possible to perform, in parallel to each other, the correction operation for correcting the displacement between the write position of the bit B3 in the subtrack STR_(N−1) and the write position of the bit B4 in the subtrack STR_N and the recording operation for recording the bit B4 in the subtrack STR_N by the write element 22w in accordance with the corrected write position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk apparatus comprising:
a disk medium being able to store a signal with three levels in a track, the track including a first subtrack and a second subtrack, the second subtrack being adjacent to the first subtrack; and
a controller that performs a first operation based on a selected level among the three levels, a first bit written in the first subtrack corresponding to the selected level, and a second bit written in the second subtrack corresponding to the selected level, the first operation including an operation to correct displacement between a write position of a third bit in the first subtrack and a write position of a fourth bit in the second subtrack in a circumferential direction of the disk medium, wherein the disk medium can further store a signal with three levels in a second track, the second track being adjacent to the track, the second track including a third subtrack and a fourth subtrack, the fourth subtrack being adjacent to the third subtrack, and the controller, in accordance with a shingled magnetic recording scheme, stores information in the first subtrack and the second subtrack and stores information in the second subtrack and the third subtrack.

2. A disk apparatus comprising:
a disk medium being able to store a signal with three levels in a track, the track including a first subtrack and a second subtrack, the second subtrack being adjacent to the first subtrack;
a controller that performs a first operation based on a selected level among the three levels, a first bit written in the first subtrack corresponding to the selected level, and a second bit written in the second subtrack corresponding to the selected level, the first operation including an operation to correct displacement between a write position of a third bit in the first subtrack and a write position of a fourth bit in the second subtrack in a circumferential direction of the disk medium; and
a head including a write element and a read element, the read element being arranged on a trailing side of the write element, wherein
the controller performs the first operation and a second operation in parallel to each other, the first operation including an operation to read a synthesized signal of the written first bit and the written second bit by the read element, the second operation including an operation to write the fourth bit in the second subtrack with the write element.

3. The disk apparatus according to claim 1, wherein the controller performs the first operation and a second operation in parallel to each other, the first operation including an operation to read a synthesized signal of the written first bit and the written second bit and to correct displacement between the write position of the third bit in the first subtrack and the write position of the fourth bit in the second subtrack based on the selected level and the synthesized signal, the second operation including an operation to write the fourth bit in the second subtrack by the write element in accordance with the corrected write position.

4. The disk apparatus according to claim 1, wherein in the first operation, the controller obtains a first parameter related to an amount of displacement between the write position of the third bit and the write position of the fourth bit based on the selected level, the written first bit, and the written second bit, and corrects the write position of the fourth bit based on the first parameter.

5. The disk apparatus according to claim 1, wherein in the first operation, the controller obtains a first parameter related to an amount of displacement between the write position of the third bit and the write position of the fourth bit and a second parameter related to an orientation of the displacement based on the selected level, the written first bit, and the written second bit, and corrects the write position of the fourth bit based on the first parameter and the second parameter.

6. The disk apparatus according to claim 4, wherein in the first operation, the controller obtains a phase shift amount of a write clock used to write the fourth bit in the second subtrack based on the selected level, the written first bit, and the written second bit as the first parameter, and corrects the write clock based on the phase shift amount.

7. The disk apparatus according to claim 5, wherein in the first operation, the controller obtains a phase shift amount of a write clock used to write the fourth bit in the second subtrack based on the selected level, the written first bit, and the written second bit as the first parameter, also obtains a phase shift orientation of the write clock as the second parameter, and corrects the write clock based on the phase shift amount and the orientation.

8. The disk apparatus according to claim 6, wherein in the first operation, the controller obtains a first error of an amplitude of the written first bit from a first target amplitude based on the selected level and the written first bit, obtains a second error of an amplitude of the written second bit from a second target amplitude based on the selected level and the written second bit, and obtains the phase shift amount based on the first error and the second error.

9. The disk apparatus according to claim 7, wherein in the first operation, the controller obtains a first error of an amplitude of the written first bit from a first target amplitude based on the selected level and the written first bit, obtains a second error of an amplitude of the written second bit from a second target amplitude based on the selected level and the written second bit, and obtains the phase shift amount and the phase shift orientation based on the first error and the second error.

10. The disk apparatus according to claim 8, wherein the controller obtains each of the first target amplitude with respect to the first subtrack and the second target amplitude with respect to the second subtrack based on the selected level, and obtains each of the amplitude of the written first bit and the amplitude of the recoded second bit based on a signal read with the head as a synthesized signal of the written first bit and the written second bit.

11. The disk apparatus according to claim 9, wherein the controller obtains each of the first target amplitude with respect to the first subtrack and the second target amplitude with respect to the second subtrack based on the selected level, and obtains each of the amplitude of the written first bit and the amplitude of the written second bit based on a signal read with the head as a synthesized signal of the written first bit and the written second bit.

12. A controller comprising:
an input circuit to receive a signal read with a head from a disk medium, the disk medium being able to store the signal with three levels in a track, the track including a first subtrack and a second subtrack, the second subtrack being adjacent to the first subtrack, the signal to be received by the input circuit being a synthesized signal of a first bit and a second bit, the first bit being written in the first subtrack corresponding to a selected level among the three levels, the second bit being written in the second subtrack corresponding to the selected level; and
a calculation circuit to obtain a correction amount of correcting displacement between a write position of a third bit in the first subtrack and a write position of a fourth bit in the second subtrack in a circumferential direction of the disk medium based on the selected level and the received signal, wherein
the calculation circuit obtains a first parameter related to an amount of displacement between the write position of the third bit and the write position of the fourth bit based on the selected level and the received signal, and obtains the correction amount based on the first parameter.

13. A controller comprising:
an input circuit to receive a signal read with a head from a disk medium, the disk medium being able to store the signal with three levels in a track, the track including a first subtrack and a second subtrack, the second subtrack being adjacent to the first subtrack, the signal to be received by the input circuit being a synthesized signal of a first bit and a second bit, the first bit being written in the first subtrack corresponding to a selected level among the three levels, the second bit being written in the second subtrack corresponding to the selected level; and
a calculation circuit to obtain a correction amount of correcting displacement between a write position of a third bit in the first subtrack and a write position of a fourth bit in the second subtrack in a circumferential direction of the disk medium based on the selected level and the received signal, wherein
the calculation circuit obtains a first parameter related to an amount of displacement between the write position of the third bit and the write position of the fourth bit and a second parameter related to an orientation of the displacement based on the selected level and the input signal, and obtains the correction amount based on the first parameter and the second parameter.

14. The controller according to claim 12, further comprising an output circuit that generates a signal in synchronization with a write clock and outputs a generated signal to the head, wherein
the calculation circuit obtains a phase shift amount of the write clock as the first parameter based on the selected level and the input signal, and obtains a correction amount of the write clock based on the phase shift amount, and
the output circuit corrects the write clock by using the correction amount of the write clock, and generates a signal to write the fourth bit in the second subtrack in synchronization with the corrected write clock.

15. The controller according to claim 13, further comprising an output circuit that generates a signal in synchronization with a write clock and outputs a generated signal to the head, wherein p1 the calculation circuit obtains a phase shift amount of the write clock as the first parameter and a phase shift orientation as the second parameter based on the selected level and the received signal, and obtains the correction amount based on the phase shift amount and the phase shift orientation, and
the output circuit corrects the write clock by using the correction amount, and generates a signal to write the fourth bit in the second subtrack in synchronization with the corrected write clock.

16. The controller according to claim 13, wherein the calculation circuit obtains each of a first target amplitude with respect to the first subtrack and a second target amplitude with respect to the second subtrack based on the selected level, obtains each of an amplitude of the written first bit and an amplitude of the written second bit based on the received signal, obtains each of a first error of the amplitude of the written first bit from the first target amplitude and a second error of the amplitude of the written second bit from the second target amplitude, and obtains the phase shift amount based on the first error and the second error.

17. The controller according to claim 14, wherein the calculation circuit obtains each of a first target amplitude with respect to the first subtrack and a second target amplitude with respect to the second subtrack based on the selected level, obtains each of an amplitude of the written first bit and an amplitude of the written second bit based on the received signal, obtains each of a first error of the amplitude of the written first bit from the first target amplitude and a second error of the amplitude of the written second bit from the second target amplitude, and obtains the phase shift amount and the orientation based on the first error and the second error.

* * * * *